(12) United States Patent
Walker

(10) Patent No.: US 9,606,774 B2
(45) Date of Patent: Mar. 28, 2017

(54) WRAPPING AN APPLICATION WITH FIELD-PROGRAMMABLE BUSINESS LOGIC

(71) Applicant: Citrix Systems, Inc., Fort Lauderdale, FL (US)

(72) Inventor: James Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/671,351

(22) Filed: Mar. 27, 2015

(65) Prior Publication Data

US 2016/0283198 A1    Sep. 29, 2016

Related U.S. Application Data

(63) Continuation-in-part of application No. 14/055,038, filed on Oct. 16, 2013.
(Continued)

(51) Int. Cl.
*G06F 9/44* (2006.01)
*G06Q 10/10* (2012.01)
*G06F 9/445* (2006.01)

(52) U.S. Cl.
CPC .............. *G06F 8/30* (2013.01); *G06F 8/65* (2013.01); *G06F 9/44505* (2013.01); *G06F 9/44521* (2013.01); *G06Q 10/10* (2013.01)

(58) Field of Classification Search
None
See application file for complete search history.

(56) References Cited

U.S. PATENT DOCUMENTS

| 5,805,803 A | 9/1998 | Birrell et al. |
| 6,151,606 A | 11/2000 | Mendez |

(Continued)

FOREIGN PATENT DOCUMENTS

| CN | 1849774 A | 10/2006 |
| CN | 101170401 A | 4/2008 |

(Continued)

OTHER PUBLICATIONS

Sep. 2, 2015—(US) Notice of Allowance—U.S. Appl. No. 13/649,071.

(Continued)

*Primary Examiner* — Chuck Kendall
(74) *Attorney, Agent, or Firm* — Banner & Witcoff, Ltd.

(57) ABSTRACT

Systems, methods, and computer-readable media for wrapping an application with field-programmable business logic are presented. In some embodiments, a computing device may load application code of a mobile application. Subsequently, the computing device may modify the application code to wrap the application with an application wrapper that is configured to manage execution of the application based on one or more policy files and configured to intercept one or more functions of the application code, where the one or more policy files each define one or more access controls that are enforced by a device management system on one or more user devices. Subsequently, the computing device may create a library file comprising field-programmable business logic defining implementation code linked to one or more of the functions intercepted by the wrapper. The computing device may then provide the wrapped application and the library file to at least one user device.

20 Claims, 6 Drawing Sheets

Related U.S. Application Data

(60) Provisional application No. 61/825,384, filed on May 20, 2013, provisional application No. 61/714,469, filed on Oct. 16, 2012.

(56) References Cited

U.S. PATENT DOCUMENTS

| | | |
|---|---|---|
| 6,154,172 A | 11/2000 | Piccionelli et al. |
| 6,480,096 B1 | 11/2002 | Gutman et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 7,043,453 B2 | 5/2006 | Stefik et al. |
| 7,065,652 B1 | 6/2006 | Xu et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,349,913 B2 | 3/2008 | Clark et al. |
| 7,415,498 B2 | 8/2008 | Russo et al. |
| 7,437,752 B2 | 10/2008 | Heard et al. |
| 7,437,755 B2 | 10/2008 | Farino et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,631,297 B2 | 12/2009 | Childress et al. |
| 7,644,377 B1 | 1/2010 | Saxe et al. |
| 7,665,125 B2 | 2/2010 | Heard et al. |
| 7,697,737 B2 | 4/2010 | Aull et al. |
| 7,716,240 B2 | 5/2010 | Lim |
| 7,761,523 B2 | 7/2010 | May et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,060,596 B1 | 11/2011 | Wootton et al. |
| 8,078,713 B1 | 12/2011 | Kim |
| 8,085,891 B2 | 12/2011 | Owen |
| 8,095,517 B2 | 1/2012 | Sandoval et al. |
| 8,095,786 B1 | 1/2012 | Kshirsagar et al. |
| 8,103,765 B2 | 1/2012 | Greifeneder et al. |
| 8,126,128 B1 | 2/2012 | Hicks, III et al. |
| 8,126,506 B2 | 2/2012 | Roundtree |
| 8,181,010 B1 | 5/2012 | Uchil et al. |
| 8,200,626 B1 | 6/2012 | Katzer et al. |
| 8,214,887 B2 | 7/2012 | Clark et al. |
| 8,238,256 B2 | 8/2012 | Nugent |
| 8,239,918 B2 | 8/2012 | Cohen |
| 8,245,285 B1 | 8/2012 | Ravishankar et al. |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,402,011 B1 | 3/2013 | Bodenhamer |
| 8,406,748 B2 | 3/2013 | Raleigh et al. |
| 8,418,238 B2 | 4/2013 | Platt et al. |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,613,070 B1 | 12/2013 | Borzycki et al. |
| 8,650,303 B1 | 2/2014 | Lang et al. |
| 8,650,620 B2 | 2/2014 | Chawla et al. |
| 8,660,530 B2 | 2/2014 | Sharp et al. |
| 8,719,898 B1 | 5/2014 | Barton et al. |
| 8,799,994 B2 | 8/2014 | Barton et al. |
| 8,806,570 B2 | 8/2014 | Barton et al. |
| 8,825,863 B2 | 9/2014 | Hansson et al. |
| 8,843,734 B2 | 9/2014 | Lim |
| 8,850,010 B1 | 9/2014 | Qureshi |
| 8,850,049 B1 | 9/2014 | Qureshi |
| 8,856,909 B1 | 10/2014 | Chickering |
| 8,863,297 B2 | 10/2014 | Sharma et al. |
| 8,863,298 B2 | 10/2014 | Akella et al. |
| 8,863,299 B2 | 10/2014 | Sharma et al. |
| 8,881,228 B2 | 11/2014 | Qureshi |
| 8,881,229 B2 | 11/2014 | Barton et al. |
| 8,918,834 B1 | 12/2014 | Samuelsson |
| 8,931,038 B2 | 1/2015 | Pulier et al. |
| 9,213,850 B2 | 12/2015 | Barton et al. |
| 9,355,253 B2 | 5/2016 | Kellerman et al. |
| 2001/0027383 A1 | 10/2001 | Maliszewski |
| 2001/0042045 A1 | 11/2001 | Howard et al. |
| 2002/0112047 A1 | 8/2002 | Kushwaha et al. |
| 2002/0120607 A1 | 8/2002 | Price et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0229623 A1 | 12/2003 | Chang et al. |
| 2003/0236861 A1 | 12/2003 | Johnson et al. |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |
| 2004/0243349 A1 | 12/2004 | Greifeneder et al. |
| 2005/0027843 A1 | 2/2005 | Bozak et al. |
| 2005/0055578 A1 | 3/2005 | Wright et al. |
| 2005/0076082 A1 | 4/2005 | Le Pennec et al. |
| 2005/0076085 A1 | 4/2005 | Budd et al. |
| 2005/0097608 A1 | 5/2005 | Penke et al. |
| 2005/0111354 A1 | 5/2005 | Asano et al. |
| 2005/0149340 A1 | 7/2005 | Murakami et al. |
| 2005/0172241 A1 | 8/2005 | Daniels et al. |
| 2005/0193222 A1 | 9/2005 | Greene |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0070114 A1 | 3/2006 | Wood et al. |
| 2006/0075123 A1 | 4/2006 | Burr et al. |
| 2006/0080432 A1 | 4/2006 | Spataro et al. |
| 2006/0085826 A1 | 4/2006 | Funk et al. |

(56) References Cited

U.S. PATENT DOCUMENTS

| | | |
|---|---|---|
| 2006/0094400 A1 | 5/2006 | Beachem et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0185004 A1 | 8/2006 | Song et al. |
| 2006/0224742 A1 | 10/2006 | Shahbazi |
| 2006/0225033 A1 | 10/2006 | Ye et al. |
| 2006/0225142 A1 | 10/2006 | Moon |
| 2006/0242685 A1 | 10/2006 | Heard et al. |
| 2006/0248577 A1 | 11/2006 | Beghian et al. |
| 2006/0253508 A1 | 11/2006 | Colton et al. |
| 2006/0259755 A1 | 11/2006 | Kenoyer |
| 2006/0282889 A1 | 12/2006 | Brown et al. |
| 2007/0005713 A1 | 1/2007 | LeVasseur et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0109983 A1 | 5/2007 | Shankar et al. |
| 2007/0118558 A1 | 5/2007 | Kahandaliyanage |
| 2007/0136471 A1 | 6/2007 | Jardin |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0266422 A1 | 11/2007 | Germano et al. |
| 2007/0283324 A1 | 12/2007 | Geisinger |
| 2008/0027982 A1 | 1/2008 | Subramanian et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0092215 A1 | 4/2008 | Soukup et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0178169 A1 | 7/2008 | Grossner et al. |
| 2008/0178300 A1 | 7/2008 | Brown et al. |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0304665 A1 | 12/2008 | Ma et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0075630 A1 | 3/2009 | McLean |
| 2009/0077638 A1 | 3/2009 | Norman et al. |
| 2009/0083374 A1 | 3/2009 | Saint Clair |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199178 A1 | 8/2009 | Keller et al. |
| 2009/0199277 A1 | 8/2009 | Norman et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0265554 A1 | 10/2009 | Robles et al. |
| 2009/0282127 A1 | 11/2009 | Leblanc et al. |
| 2009/0282473 A1 | 11/2009 | Karlson et al. |
| 2009/0323916 A1 | 12/2009 | O'Sullivan et al. |
| 2009/0325615 A1 | 12/2009 | McKay et al. |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0077469 A1 | 3/2010 | Furman et al. |
| 2010/0083358 A1 | 4/2010 | Govindarajan et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0235216 A1 | 9/2010 | Hehmeyer et al. |
| 2010/0248699 A1 | 9/2010 | Dumais |
| 2010/0257580 A1 | 10/2010 | Zhao et al. |
| 2010/0269156 A1 | 10/2010 | Hohlfeld et al. |
| 2010/0279652 A1 | 11/2010 | Sharp et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0145360 A1 | 6/2011 | Sheshagiri et al. |
| 2011/0145833 A1 | 6/2011 | De Los Reyes et al. |
| 2011/0154266 A1 | 6/2011 | Friend et al. |
| 2011/0154477 A1 | 6/2011 | Parla et al. |
| 2011/0154498 A1 | 6/2011 | Fissel et al. |
| 2011/0179484 A1 | 7/2011 | Tuvell et al. |

(56) References Cited

U.S. PATENT DOCUMENTS

| | | |
|---|---|---|
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0023556 A1 | 1/2012 | Schultz et al. |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0159334 A1 | 6/2012 | Messerly et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0198570 A1 | 8/2012 | Joa et al. |
| 2012/0204220 A1 | 8/2012 | Lavi |
| 2012/0209949 A1 | 8/2012 | Deliyannis et al. |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0246731 A1 | 9/2012 | Blaisdell et al. |
| 2012/0250106 A1 | 10/2012 | Kiran Kannambadi et al. |
| 2012/0254768 A1 | 10/2012 | Aggarwal et al. |
| 2012/0255026 A1 | 10/2012 | Baca et al. |
| 2012/0265528 A1 | 10/2012 | Gruber et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0035063 A1 | 2/2013 | Fisk et al. |
| 2013/0042294 A1 | 2/2013 | Colvin et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0084847 A1 | 4/2013 | Tibbitts et al. |
| 2013/0086684 A1 | 4/2013 | Mohler |
| 2013/0091543 A1 | 4/2013 | Wade et al. |
| 2013/0097421 A1 | 4/2013 | Lim |
| 2013/0097660 A1 | 4/2013 | Das et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0132457 A1 | 5/2013 | Diwakar |
| 2013/0132941 A1 | 5/2013 | Lindeman et al. |
| 2013/0133043 A1 | 5/2013 | Barkie et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0145448 A1 | 6/2013 | Newell |
| 2013/0151598 A1 | 6/2013 | Fu et al. |
| 2013/0151681 A1 | 6/2013 | Dournov et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219176 A1 | 8/2013 | Akella et al. |

(56) References Cited

U.S. PATENT DOCUMENTS

| | | |
|---|---|---|
| 2013/0219211 A1 | 8/2013 | Gopinath et al. |
| 2013/0219456 A1 | 8/2013 | Sharma et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0311593 A1 | 11/2013 | Prince et al. |
| 2013/0311597 A1 | 11/2013 | Arrouye et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0007222 A1 | 1/2014 | Qureshi et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047413 A1 | 2/2014 | Sheive et al. |
| 2014/0047535 A1 | 2/2014 | Parla et al. |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0108649 A1 | 4/2014 | Barton et al. |
| 2014/0109072 A1* | 4/2014 | Lang .................. G06F 8/52 717/168 |
| 2014/0109078 A1 | 4/2014 | Lang et al. |
| 2014/0130174 A1 | 5/2014 | Celi, Jr. et al. |
| 2014/0162614 A1 | 6/2014 | Lindeman et al. |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189808 A1 | 7/2014 | Mahaffey et al. |
| 2014/0298401 A1 | 10/2014 | Batson et al. |
| 2014/0315536 A1 | 10/2014 | Chow et al. |
| 2015/0026827 A1 | 1/2015 | Kao et al. |
| 2015/0087270 A1 | 3/2015 | Richardson et al. |

FOREIGN PATENT DOCUMENTS

| | | |
|---|---|---|
| CN | 101572678 A | 11/2009 |
| EP | 1465039 A1 | 10/2004 |
| EP | 2403211 A1 | 1/2012 |
| EP | 2428894 A1 | 3/2012 |
| EP | 2523107 A1 | 11/2012 |
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2009021200 A1 | 2/2009 |
| WO | 2010054258 A1 | 5/2010 |
| WO | 2010115289 A1 | 10/2010 |

OTHER PUBLICATIONS

Sep. 22, 2015—(US) Non-final Office Action—U.S. Appl. No. 14/607,593.
Oct. 8, 2015—(US) Final Office Action—U.S. Appl. No. 14/015,194.
Oct. 9, 2015—(US) Final Office Action—U.S. Appl. No. 14/043,902.
Oct. 9, 2015—(US) Notice of Allowance—U.S. Appl. No. 13/886,889.
Oct. 28, 2015—(US) Notice of Allowance—U.S. Appl. No. 13/886,889.
Nov. 3, 2015—(US) Non-Final Office Action—U.S. Appl. No. 14/733,490.
Nov. 5, 2015—(EP) Office Action—App 13773923.1.
Nov. 23, 2015—(US) Non-final Office Action—U.S. Appl. No. 14/032,643.
Dec. 2, 2015—(US) Non-final Office Action—U.S. Appl. No. 14/021,227.
Dec. 10, 2015—(US) Final Office Action—U.S. Appl. No. 14/340,096.
Dec. 14, 2015—(US) Non-final Office Action—U.S. Appl. No. 14/022,935.
Dec. 18, 2015—Non-final Office Action—U.S. Appl. No. 14/039,632.
Dec. 22, 2015—(US) Final Office Action—U.S. Appl. No. 14/106,171.
Jan. 21, 2016—(US) Non-final Office Action—U.S. Appl. No. 13/649,073.
Feb. 3, 2016—(US) Notice of Allowance—U.S. Appl. No. 14/040,831.
Feb. 23, 2016—(US) Non-Final Office Action—U.S. Appl. No. 14/039,651.
Feb. 29, 2016—(US) Ex pane Quayle—U.S. Appl. No. 14/242,011.
Feb. 24, 2016—(US) Notice of Allowance—U.S. Appl. No. 14/015,194.
Feb. 29, 2016—(US) Notice of Allowance—U.S. Appl. No. 13/649,076.
Mar. 16, 2016—(US) Notice of Allowance—U.S. Appl. No. 14/106,171.
Mar. 30, 2016—(US) Final Office Action—U.S. Appl. No. 13/963,739.
Apr. 7, 2016—(US) Non-final Office Action—U.S. Appl. No. 14/340,096.
Apr. 4, 2016—(US) Notice of Allowance—U.S. Appl. No. 14/607,593.
Apr. 25, 2016—(US) Non-final Office Action—U.S. Appl. No. 14/508,245.
Mar. 25, 2016—(CN) Office Action—App 201380057326.1.
May 12, 2016—(US) Final Office Action—U.S. Appl. No. 14/733,490.
May 20, 2016—(US) Notice of Allowance—U.S. Appl. No. 14/032,643.
H. Hamed, E. Al-Shaer and W. Marrero "Modeling and verfication of IPSec and VPN security policies," 13th IEEE International Conference on Network Protocols (ICNP'05), 2005, pp. 10.
A. F. G. Skarmeta and G. M. Perez, "Policy-based dynamic provision of IP services in a secure VPN coalition scenario," in IEEE Communications Magazine, vol. 42, No. 11, pp. 118-124, Nov. 2004.
Jun. 7, 2016—(US) Notice of Allowance—U.S. Appl. No. 14/242,011.

(56) References Cited

OTHER PUBLICATIONS

Jun. 22, 2016—(US) Final Office Action—U.S. Appl. No. 13/963,833.
Jun. 20, 2016—(EP) Extended European Search Report—App 13795317.
Jun. 22, 2016—(US) Final Office Action—U.S. Appl. No. 14/025,898.
Notice of Allowance issued in corresponding U.S. Appl. No. 14/043,343 mailed May 29, 2014.
Final Office Action received in corresponding U.S. Appl. No. 14/041,911 mailed May 29, 2014.
Notice of Allowance issued in U.S. Appl. No. 14/032,439 mailed Jun. 4, 2014.
Final Office Action received in corresponding U.S. Appl. No. 14/032,820 mailed Jun. 4, 2014.
Notice of Allowance issued in corresponding U.S. Appl. No. 14/032,756 mailed Jun. 2, 2014.
Notice of Allowance issued in corresponding U.S. Appl. No. 14/042,984 mailed May 27, 2014.
Final Office Action received in corresponding U.S. Appl. No. 14/032,885 mailed Jun. 6, 2014.
Notice of Allowance issued in corresponding U.S. Appl. No. 14/015,245, mailed May 27, 2014.
Jun. 3, 2014—Search Report and Written Opinion issued in International Application No. PCT/US2013/060047.
Jul. 1, 2011—Wright et al., "Your Firm's Mobile Devices: How Secure are They?" Journal of Corporate Accounting and Finance, Willey Periodicals. pp. 13-21.
Final Office Action issued in U.S. Appl. No. 14/044,946 mailed Jun. 23, 2014.
Final Office Action received in corresponding U.S. Appl. No. 14/043,229 mailed Jun. 24, 2014.
Notice of Allowance issued in U.S. Appl. No. 13/649,063 mailed Jun. 24, 2014.
Notice of Allowance issued in corresponding U.S. Appl. No. 13/649,064 mailed Jul. 9, 2014.
Notice of Allowance issued in corresponding U.S. Appl. No. 14/042,941, mailed Jun. 26, 2014.
Notice of Allowance issued in corresponding U.S. Appl. No. 14/041,935 mailed Jul. 8, 2014.
Final Office Action received in U.S. Appl. No. 13/963,833 on Jul. 18, 2014.
Notice of Allowance issued in U.S. Appl. No. 14/044,972 mailed Jul. 10, 2014.
Jul. 11, 2014—(US) Non-Final Office Action—U.S. Appl. No. 13/649,024.
Final Office Action issued in corresponding U.S. Appl. No. 14/032,643, mailed Jul. 24, 2014.
Jul. 17, 2014—(US) Non-Final Office Action—U.S. Appl. No. 13/649,022.
Final Office Action received in U.S. Appl. No. 13/963,833, mailed on Jul. 18, 2014.
Final Office Action issued in U.S. Appl. No. 13/649,069 mailed Jul. 28, 2014.
Notice of Allowance issued in corresponding U.S. Appl. No. 11/043,164 mailed Jul. 29, 2014.
Notice of Allowance issued in corresponding U.S. Appl. No. 14/043,012 mailed Jul. 21, 2014.
Final Office Action received in corresponding U.S. Appl. No. 14/043,086 mailed Aug. 7, 2014.
Final Office Action received in corresponding U.S. Appl. No. 13/963,851 mailed Aug. 7, 2014.
Notice of Allowance issued in corresponding U.S. Appl. No. 14/029,088 mailed Aug. 30, 2014.
Notice of Allowance issued in corresponding U.S. Appl. No. 14/041,946 mailed Aug. 1, 2014.
Notice of Allowance issued in U.S. Appl. No. 14/029,096 mailed Aug. 5, 2014.
Notice of Allowance issued in U.S. Appl. No. 14/029,068 mailed Aug. 7, 2014.
Final Office Action issued in corresponding U.S. Appl. No. 14/043,301, mailed Aug. 21, 2014.
Final Office Action received in corresponding U.S. Appl. No. 14/045,014 mailed on Jul. 3, 2014.
Aug. 29, 2014—(US) Final Office Action—U.S. Appl. No. 13/649,073.
Oct. 25, 2010—Andreas, "Digging into The Exchange ActiveSync Protocol," Mobility Dojo.net, http://mobilitydojo.net/2010/03/17/digging-into-the-exchange-activesync-protocol/.
Aug. 29, 2014—(US) Final Office Action—U.S. Appl. No. 13/649,076.
Aug. 8, 2014—(US) Notice of Allowance—U.S. Appl. No. 14/032,885.
Sep. 5, 2014—(US) Non-Final Office Action—U.S. Appl. No. 13/648,993.
Sep. 8, 2014—(US) Final Office Action—U.S. Appl. No. 13/886,889.
Sep. 18, 2014—(US) Final Office Action—U.S. Appl. No. 13/649,071.
Sep. 26, 2014—(US) Final Office Action—U.S. Appl. No. 14/044,989.
Oct. 6, 2014—(US) Notice of Allowance—U.S. Appl. No. 14/041,911.
Oct. 10, 2014—(US) Final Office Action—U.S. Appl. No. 14/032,643.
Oct. 20, 2014—(PCT) International Search Report—App PCT/US2014/036382.
Nov. 21, 2014—(US) Non-Final Office Action—U.S. Appl. No. 14/044,946.
Nov. 5, 2014—(US) Non-Final Office Action—U.S. Appl. No. 14/045,014.
Nov. 5, 2014—(US) Non-Final Offie Action—U.S. Appl. No. 13/886,765.
Nov. 26, 2014—(US) Non-Final Office Action—U.S. Appl. No. 13/963,851.
Sep. 29, 2014—(PCT) International Search Report—App PCT/US2014/036326.
Nov. 24, 2014—(US) Notice of Allowance—U.S. Appl. No. 14/043,301.
International Search Report and Written Opinion of International Application No. PCT/US2015/026781, dated Nov. 13, 2015.
"Towards Trust Services for Language-Based Virtual Machines for Grid Computing," Tobias Vejda et al., Trusted Computing—Challenges and Applications, ISBN: 978-3-540-68978-2, Mar. 11, 2008.
Jan. 5, 2015—(US) Non-Final Office Action—U.S. Appl. No. 14/027,929.
Jan. 7, 2015—(US) Notice of Allowance & Fees Due—U.S. Appl. No. 14/045,014.
Jan. 22, 2015—(US) Notice of Allowance—U.S. Appl. No. 13/963,851.
Dec. 29, 2014—(US) Final Office Action—U.S. Appl. No. 13/649,022.
Jan. 5, 2015—(US) Non-Final Office Action—U.S. Appl. No. 13/649,071.
Jan. 26, 2015—(US) Non-Final Office Action—U.S. Appl. No. 13/886,889.
Jan. 27, 2015—(US) Non-Final Office Action—U.S. Appl. No. 13/963,758.
Dec. 22, 2014—(US) Non-Final Office Action—U.S. Appl. No. 13/649,069.
Feb. 12, 2015—(US) Non-Final Office Action—U.S. Appl. No. 13/963,833.
Feb. 18, 2015—(US) Non-Final Office Action—U.S. Appl. No. 14/043,229.
Dec. 20, 2013—(PCT) International Search Report and Written Opinion—App PCT/US2013/063363.
Dec. 19, 2014—(US) Non-Final Office Action—U.S. Appl. No. 14/043,331.
Mar. 5, 2015 (US) Non-Final Office Action—U.S. Appl. No. 14/039,651.
Apr. 2, 2015—(US) Final Office Action—U.S. Appl. No. 14/022,935.

(56) References Cited

OTHER PUBLICATIONS

Mar. 25, 2015—(US) Non-Final Office Action—U.S. Appl. No. 14/044,919.
Apr. 6, 2015—(US) Non-Final Office Action—U.S. Appl. No. 14/039,632.
Apr. 14, 2015—(US) Notice of Allowance & Fees Due—U.S. Appl. No. 14/043,086.
Apr. 16, 2015—(US) Notice of Allowance & Fees Due—U.S. Appl. No. 13/886,765.
Jul. 11, 2014—(PCT) Written Opinion and International Search Report—App PCT/US13/63261.
May 19, 2015—(US) Notice of Allowance & Fees Due—U.S. Appl. No. 13/648,993.
May 22, 2015—(US) Non-Final Office Action—U.S. Appl. No. 14/106,171.
2011—Laverty, Joseph Packy et al., "Comparative Analysis of Mobile Application Development and Security Models," Issues in Information Systems vol. XII, No. 1, [Retrieved from the Internet] <http://iacis.org/is/2011/301-312_AL2011_1694.pdf> pp. 301-312.
2012—Potharaju, Rahul et al., "Plagiarizing smartphone applications: attack strategies and defense techniques," [Online] Engineering Secure Software and Systems, Springer Berlin Heidelberg, [Retrieved from the Internet] <http://link.springer.com/chapter/10.1007/978-3-642-28166-2_11#> pp. 106-120.
1998—Peine, H., "Security concepts and implementation in the Ara mobile agent system," [Online] 1998, Enabling Technologies: Infrastructure for Collaborative Enterprises, Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.
2006—Shah et al., "Securing Java-Based Mobile Agents through Byte Code Obfuscation Techniques," [Online] Dec. 23-24, 2006, Multitopic Conference, 2006, INMIC '06. IEEE, [Retrieved from the Internet] <http://ieeexploreieee.org/stamp/stamp.jsp?tp=&arnumber=4196425&isnumber=414013> pp. 305-308.
May 20, 2015—(US) Notice of Allowance & Fees Due—U.S. Appl. No. 13/649,022.
May 20, 2015—(US) Notice of Allowance & Fees Due—U.S. Appl. No. 13/649,069.
Jun. 5, 2015—(US) Final Office Action—U.S. Appl. No. 13/649,071.
Jun. 9, 2015—(US) Notice of Allowance—U.S. Appl. No. 14/043,229.
Jun. 15, 2015—(US) Non-Final Office Action—U.S. Appl. No. 13/649,076.
Jun. 18, 2015—(US) Non-Final Office Action—U.S. Appl. No. 14/043,902.
Jun. 23, 2015—(US) Notice of Allowance—U.S. Appl. No. 14/043,229.
2008—Administration Guide for Symantec Endpoint Protection and Symantec Network Access Control; Retrieved from the Internet <<URL:ftp.symantec.com/public/english_us_canada/products/symantec_endpoint_protection/11.0/manuals/administration_guide.pdf>; pp. 1-615.
2007—Symantec Network Access Control Enforcer Implementation Guide; Retrieved from the Internet <<URL:ftp.symantec.com/public/english_us_canada/products/symantec_network_access_control/11.0/manuals/enforcer_implementation_guide.pdf>; pp. 1-132.
Jul. 6, 2015—(US) Notice of Allowance—U.S. Appl. No. 13/649,024.
Jul. 9, 2015—(US) Final Offcie Action—U.S. Appl. No. 13/963,833.
Jul. 8, 2015—(US) Non-Final Office Action—U.S. Appl. No. 14/340,096.
Jul. 22, 2015—(US) Notice of Allowance—U.S. Appl. No. 13/963,758.
Jul. 23, 2015—(US) Non-Final Office Action—U.S. Appl. No. 14/025,898.
Jul. 29, 2015—(US) Final Office Action—U.S. Appl. No. 13/886,889.
Aug. 4, 2015—(US) Non-Final Office Action—U.S. Appl. No. 13/963,739.
Aug. 5, 2015—(US) Notice of Allowance—U.S. Appl. No. 13/886,765.
Aug. 7, 2015—(US) Final Office Action—U.S. Appl. No. 14/043,331.
Aug. 14, 2015—(US) Non-final Office Action—U.S. Appl. No. 14/040,831.
Aug. 17, 2015—(US) Final Office Action—U.S. Appl. No. 14/039,632.
Aug. 20, 2015—(US) Non-Final Office Action—U.S. Appl. No. 14/242,011.
Aug. 21, 2015—(US) Final Office Action—U.S. Appl. No. 14/039,651.
Aug. 24, 2015—(US) Non-final Office Action—U.S. Appl. No. 14/535,597.
Aug. 14, 2015—(US) Notice of Allowance—U.S. Appl. No. 14/044,919.
Aug. 26, 2015—(US) Final Office Action—U.S. Appl. No. 14/027,929.
Aug. 1, 2012—"TPS Development Using the Microsoft .NET Framework", Teresa P. Lopes, IEEE Instrumentation & Measurement Magazine (vol. 15, No. 4).
Apr. 28, 2003—"Managed, Unamanaged, Native: What Kind of Good Is This?", Kate Gregory, Developer.com, Retrieved from internet: http://www.developer.com/print.php/2197621.
Mar. 26, 2015—(US) Non-Final Office Action—U.S. Appl. No. 14/055,038.
Nov. 12, 2015—(US) Final Office Action—U.S. Appl. No. 14/055,038.
Jul. 31, 2012—Citrix: "Citrix XenMobile Technology Overview White Paper"; Citrix White papers online, pp. 1-14, XP055098728, Retrieved from the Internet: URL:http://www.insight.com/content/dam/onsight/en_US/pdfs/citrix/xenmobile-tech-overview.pdf, [retrieved on Jan. 27, 2014] the whole document.
Aug. 1, 2012—Teresa P. Lopes et al: "TPS development using the Microsoft .NET framework", IEEE Instrumentation & Measurement Magazine, IEEE Service Center, Piscataway, NJ; US, vol. 15, No. 4, pp. 34-39, XP011456193, ISSN: 1094-6969, DOI: 10.1109/MIM.2012.6263982, the whole document.
Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.
Feb. 10, 2014—(PCT) Search Report—App PCT/US/2013/065245.
Oct. 22, 2014—(US) Non-Final Office Action—U.S. Appl. No. 14/055,078.
Jun. 17, 2015—(US) Notice of Allowance—U.S. Appl. No. 14/055,078.
Notice of Allowance issued in U.S. Appl. No. 14/022,845 mailed Dec. 6, 2013.
Non-Final Office Action issued in corresponding U.S. Appl. No. 14/044,998 mailed Dec. 20, 2013.
Non-final Office Action issued in U.S. Appl. No. 14/044,928 mailed Dec. 18, 2013.
Non-final Office Action issued in U.S. Appl. No. 14/022,935 mailed Dec. 24, 2013.
Non-final Office Action issued in U.S. Appl. No. 14/045,005 mailed Jan. 17, 2014.
Non-final Office Action issued in U.S. Appl. No. 14/045,014 mailed Jan. 30, 2014.
Non-Final Office Action issued in corresponding U.S. Appl. No. 14/044,946 dated Feb. 3, 2014.
Non-Final Office Action issued in U.S. Appl. No. 14/096,418 mailed Feb. 10, 2014.
Non-final Office Action issued in U.S. Appl. No. 14/015,245 mailed Dec. 10, 2013.
Non-final Office Action issued in U.S. Appl. No. 14/043,301 mailed Dec. 20, 2013.

(56) References Cited

OTHER PUBLICATIONS

Non-Final Office Action issued in corresponding U.S. Appl. No. 14/042,941 mailed Dec. 27, 2013.
Non-Final Office Action issued in corresponding U.S. Appl. No. 14/043,012 mailed Dec. 27, 2013.
Non-Final Office Action issued in corresponding U.S. Appl. No. 14/042,984 mailed Dec. 31, 2013.
Non-final Office Action issued in U.S. Appl. No. 14/043,229 mailed Jan. 6, 2014.
Notice of Allowance issued in corresponding U.S. Appl. No. 14/041,923, mailed Dec. 23, 2013.
Non-final Office Action issued in U.S. Appl. No. 14/041,935 mailed Jan. 24, 2014.
Office Action issued in corresponding U.S. Appl. No. 14/041,911, mailed Dec. 16, 2013.
Office Action issued in corresponding U.S. Appl. No. 14/029,096, mailed Dec. 5, 2011.
Dec. 13, 2005—Lowe, "Application-Specific VPNs".
Office Action issued in corresponding U.S. Appl. No. 14/029,088, mailed Dec. 5, 2013.
Office Action issued in corresponding U.S. Appl. No. 14/029,077, mailed Dec. 19, 2013.
Office Action issued in corresponding U.S. Appl. No. 14/029,068, mailed Dec. 5, 2013.
Non-Final Office Action dated Dec. 19, 2013 in U.S. Appl. No. 14/032,885.
Non-final Office Action issued in U.S. Appl. No. 14/032,756 mailed Jan. 9, 2014.
Non-final Office Action issued in U.S. Appl. No. 14/032,820 mailed Jan. 10, 2014.
Non-final Office Action issued in U.S. Appl. No. 14/032,643 mailed Feb. 4, 2014.
Non-Final Office Action issued in U.S. Appl. No. 14/032,439 mailed Feb. 3, 2014.
Non-final Office Action issued in U.S. Appl. No. 13/649,063 mailed Nov. 7, 2013.
Restriction Requirement issued in U.S. Appl. No. 13/649,071 mailed Nov. 22, 2013.
Nov. 26, 2013—International Search Report and Written Opinion in International Application No. PCT/US2013/060388.
Restriction Requirement issued in U.S. Appl. No. 13/649,076 mailed Jan. 13, 2013.
Non-Final Office Action issued in U.S. Appl. No. 13/648,993 mailed Jan. 17, 2014.
Apr. 2012—Xuetao Wei, et al., "Malicious Android Applications in the Enterprise: What Do They Do and How Do We Fix It?,"? ICDE Workshop on Secure Data Management on Smartphones and Mobiles, 4 pages.
Notification of Concurrently Filed Applications in 1 page.
Office Action received in U.S. Appl. No. 13/963,794 mailed Oct. 17, 2013.
2012—Ranjan et al., "Programming Cloud Resource Orchestration Framework: Operations and Research Challenges", arvix.org, pp. 1-19.
2010—Na et al., "Personal Cloud Computing Security Framework," 2010 IEEE Asia-Pacific Computing Conference, pp. 671-675.
Notice of Allowance issued in U.S. Appl. No. 13/963,825 mailed Oct. 25, 2013.
2003—Wilson et al., "Unified Security Framework", In proceedings of the 1st International Symposium on Information and Communication Technologies, pp. 500-505. Trinity College Dublin.
2003—Mysore et al., "The Liquid Media System—a Multi-Device Streaming Media Orchestration Framework", Ubicomp 2003 Workshop, pp. 1-4.
Office Action received in U.S. Appl. No. 13/963,811 mailed Nov. 8, 2013.
Office Action received in U.S. Appl. No. 13/963,825 mailed Nov. 6, 2013.
Restriction Requirement issued in U.S. Appl. No. 13/963,833 mailed Dec. 19, 2013.
Non-final Office Action issued in U.S. Appl. No. 13/963,758 mailed Dec. 19, 2013.
Jan. 10, 2014—(PCT) Written Opinion and International Search Report, PCT/US2013/062636.
Non-final Office Action issued in U.S. Appl. No. 13/963,851 mailed Jan. 24, 2014.
Feb. 4, 2014—International Search Report and Written Opinion in Application No. PCT/US2013/064349.
Non-final Office action received in corresponding U.S. Appl. No. 14/044,901 dated Febraury 24, 2014.
Non-final Office Action received in corresponding U.S. Appl. No. 13/963,833 dated Feb. 24, 2014.
Non-final Office action received in corresponding U.S. Appl. No. 13/649,073 dated Feb. 24, 2014.
Non-Final Office Action issued in U.S. Appl. No. 14/015,108 mailed Nov. 15, 2013.
Jan. 21, 2014—International Search Report and Written Opinion in International Application No. PCT/US2013/063856.
Non-Final Office Action issued in U.S. Appl. No. 13/963,833 mailed Februay 24, 2014.
Non-Final Office Action dated Dec. 23, 2013, in U.S. Appl. No. 14/043,343.
Non-Final Office Actin dated Dec. 30, 2013, in U.S. Appl. No. 14/043,164.
Non-Final Office Action dated Dec. 19, 2013, in U.S. Appl. No. 14/032,706.
Jan. 2013—Apple Inc., iPad User Guide for iOS 6.1 Software, Chapter 26, Accessibility, pp. 107-108.
Non-final Office Action received in corresponding U.S. Appl. No. 14/096,380 dated Feb. 28, 2014.
Non-Final Office Action received in corresponding U.S. Appl. No. 13/649,064 mailed Mar. 18, 2014.
Feb. 24, 2014—(PCT) International Search Report and Written Opinion—App PCT/US2013/060379.
Mar. 6, 2014—International Search Report and Written Opinion in International Application No. PCT/US2013/064319.
Non-Final Office Action received in corresponding U.S. Appl. No. 13/649,071 mailed Mar. 20, 2014.
Feb. 6, 2014—International Search Report and Written opinion in International Application No. PCT/US2013/064076.
Non-Final Office Action dated Mar. 25, 2014 in U.S. Appl. No. 14/043,086.
Mar. 17, 2014—International Search Report and Written Opinion in International Application No. PCT/US2013/064279.
Non-Final Office Action received in corresponding U.S. Appl. No. 14/043,086 mailed Mar. 25, 2014.
Final Office Action received in corresponding U.S. Appl. No. 13/963,758 mailed Mar. 27, 2014.
Non-final Office Action received in corresponding U.S. Appl. No. 13/649,069 mailed Mar. 27, 2014.
Non-Final Office Action received in corresponding U.S. Appl. No. 14/041,946 mailed Mar. 6, 2014.
Final Office Action received in corresponding U.S. Appl. No. 14/022,935 mailed Mar. 28, 2014.
Final Office Action received in corresponding U.S. Appl. No. 14/029,077 mailed Apr. 7, 2014.
Non-Final Office Action dated Apr. 8, 2014 in U.S. Appl. No. 13/886,889.
Apr. 4, 2014—International Search Report and Written Opinion in International Application No. PCT/US2013/063429.
Jul. 31, 2012—"Citrix XenMobile Technology Overview: White Paper," Citrix White Papers online, pp. 1-14; retrieved from http://insight.com/content/aam/insight/en_US/pdfs/citrix/senmobile-tech-overview.pdf, retrieved Jan. 27, 2014.
Final Office Action received in corresponding U.S. Appl. No. 14/015,108 mailed Apr. 11, 2014.
Notice of Allowance issued in corresponding U.S. Appl. No. 14/032,706 mailed Apr. 14, 2014.
Final Office Action received in corresponding U.S. Appl. No. 14/096,380 mailed Apr. 21, 2014.
Non-Final Office Action received in corresponding U.S. Appl. No. 14/044,972 mailed May 2, 2014.

(56) References Cited

OTHER PUBLICATIONS

Final Office Action dated May 7, 2014 in U.S. Appl. No. 14/029,088.
Final Office Action recevied in corresponding U.S. Appl. No. 14/029,068 mailed May 7, 2014.
Final Office Action received in corresponding U.S. Appl. No. 14/029,088 mailed May 7, 2014.
Final Office Action received in corresponding U.S. Appl. No. 14/029,096 mailed May 8, 2014.
Notice of Allowance issued in corresponding U.S. Appl. No. 14/044,928, mailed May 5, 2014.
Notice of Allowance issued in U.S. Appl. No. 14/044,901 mailed May 19, 2014.
Final Office Action received in corresponding U.S. Appl. No. 14/044,998 mailed May 16, 2014.
Final Office Action received in corresponding U.S. Appl. No. 14/096,418 mailed May 16, 2014.
Non-Final Office Action received in corresponding U.S. Appl. No. 13/649,076 mailed May 19, 2014.
Non-Final Office Action received in corresponding U.S. Appl. No. 14/044,989 mailed May 20, 2014.

* cited by examiner

WRAPPING AN APPLICATION WITH FIELD-PROGRAMMABLE BUSINESS LOGIC

BACKGROUND

Aspects of the disclosure generally relate to computing hardware and computer software. In particular, one or more aspects of the disclosure relate to computing hardware and computer software for wrapping an application with field-programmable business logic.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, device administrators demand more efficient and convenient tools for managing large numbers of complex devices running complex applications. Administrators have demanded and will continue to demand greater convenience, functionality, and ease-of-use from their computing devices and the computer software with which they interact.

SUMMARY

Aspects of the disclosure relate to various systems and techniques that provide more convenient, functional, and easy-to-use ways for administrators to manage complex devices and complex applications.

Some mobile device applications may include multiple wrapped applications that may be modified according to policies. For example, camera software on a mobile device may be restricted using policies on a user's mobile device so as to be inoperable. Because there may be a large number of applications that may be available to enterprise users of an organization and administered and managed by administrative users of the organization and mobile device management software, techniques for efficiently and effectively distributing applications and updates to client devices can be useful to organizations and administrative users in managing applications. In accordance with one or more aspects of the disclosure discussed in greater detail below, components of a wrapped application may be delivered in different pieces that are individually updateable.

Aspects of the disclosure provide efficient, effective, and convenient ways of updating managed applications. In particular, in accordance with various aspects of the disclosure, a mobile device may receive an update to a wrapped application or to a library file comprising business logic. The updates may be managed by a central server, which may push updates or respond to requests from the mobile device.

In accordance with one or more aspects of the disclosure, a computing device may load application code of a mobile application. Subsequently, the computing device may modify the application code to wrap the application with an application wrapper that is configured to manage execution of the application based on one or more policy files and configured to intercept one or more functions of the application code, where the one or more policy files each define one or more access controls that are enforced by a device management system on one or more user devices. In some embodiments, the library file may be an iOS library. Subsequently, the computing device may create a library file comprising field-programmable business logic defining implementation code linked to one or more of the functions intercepted by the wrapper. The computing device may then provide the wrapped application and the library file to at least one user device.

In some embodiments, modifying the application code may include adding at least one stub function to the application wrapper, and the at least one stub function may reference the implementation code provided in the library file. Additionally or alternatively, modifying the application code may include renaming a function defined in an application programming interface used by the application to cause execution of at least a portion of the implementation code defined in the field programmable business logic. Additionally or alternatively, modifying the application code may include inserting at least one application hook into the application, and the at least one application hook may cause execution of a portion of the implementation code defined in the field programmable business logic.

In some embodiments, after providing the wrapped application and the library file to the at least one user device, the computing device may create an updated library file. In some instances, the updated library file may include updated field-programmable business logic defining updated implementation code linked to functions intercepted by the wrapper. The computing device may then provide the updated library file to the at least one user device to cause the application wrapper to use the updated business logic to manage execution of the wrapped application. In some instances, the updated library file may be provided to the at least one user device in response to determining that the at least one user device is using outdated business logic. In some instances, providing the updated library file to the at least one user device may cause the application wrappers of other applications to use the updated business logic to manage execution of other wrapped applications.

In some embodiments, a user device may receive an indication that an update to a library file is available. In some instances, the library file may include field programmable business logic defining implementation code linked to one or more functions intercepted by the wrapper. In some instances, the wrapper may be configured to manage execution of a mobile application on the computing device based on one or more policy files defining one or more access controls that are enforced by a device management system on the computing device.

In some embodiments, after receiving an indication of the updated to the first library file, the computing device may receive an application update indicating that an update to a wrapper for the application is available. Subsequently, the computing device may update the wrapped application, and may replace the wrapper and the application with the wrapped application.

These and additional aspects are discussed in further detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a method of wrapping an application with field-programmable business logic. A system may use wrap an application in order to provide more effective means of application and device management and to enforce polices. Field-programmable business logic may be used to allow for flexibility in programming and maintaining updates for a user device. As a result, an administrator may advantageously apply updates to field-programmable business logic without having to re-wrap an application.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
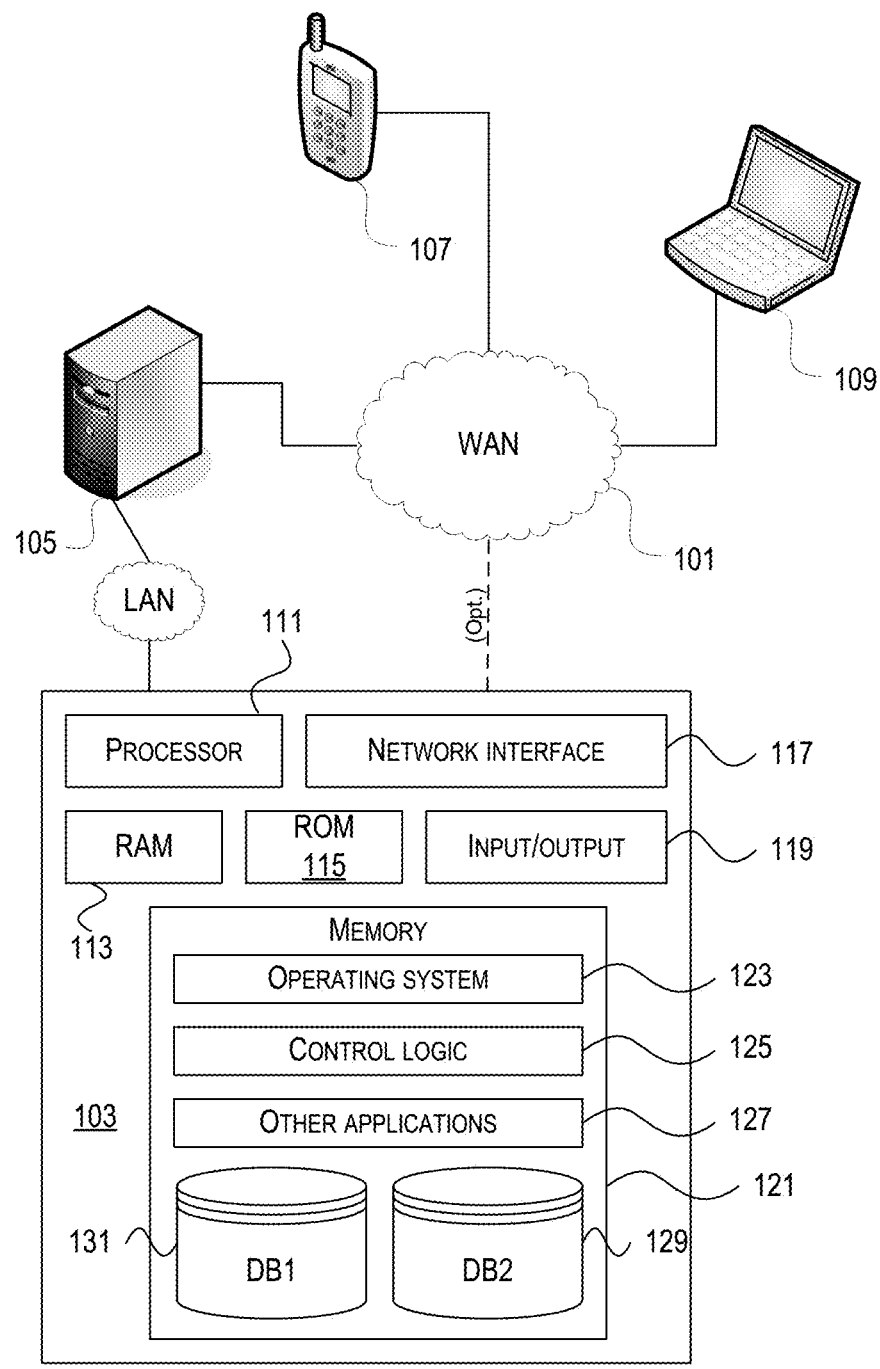
FIG. 1 depicts an example computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from remote computer 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
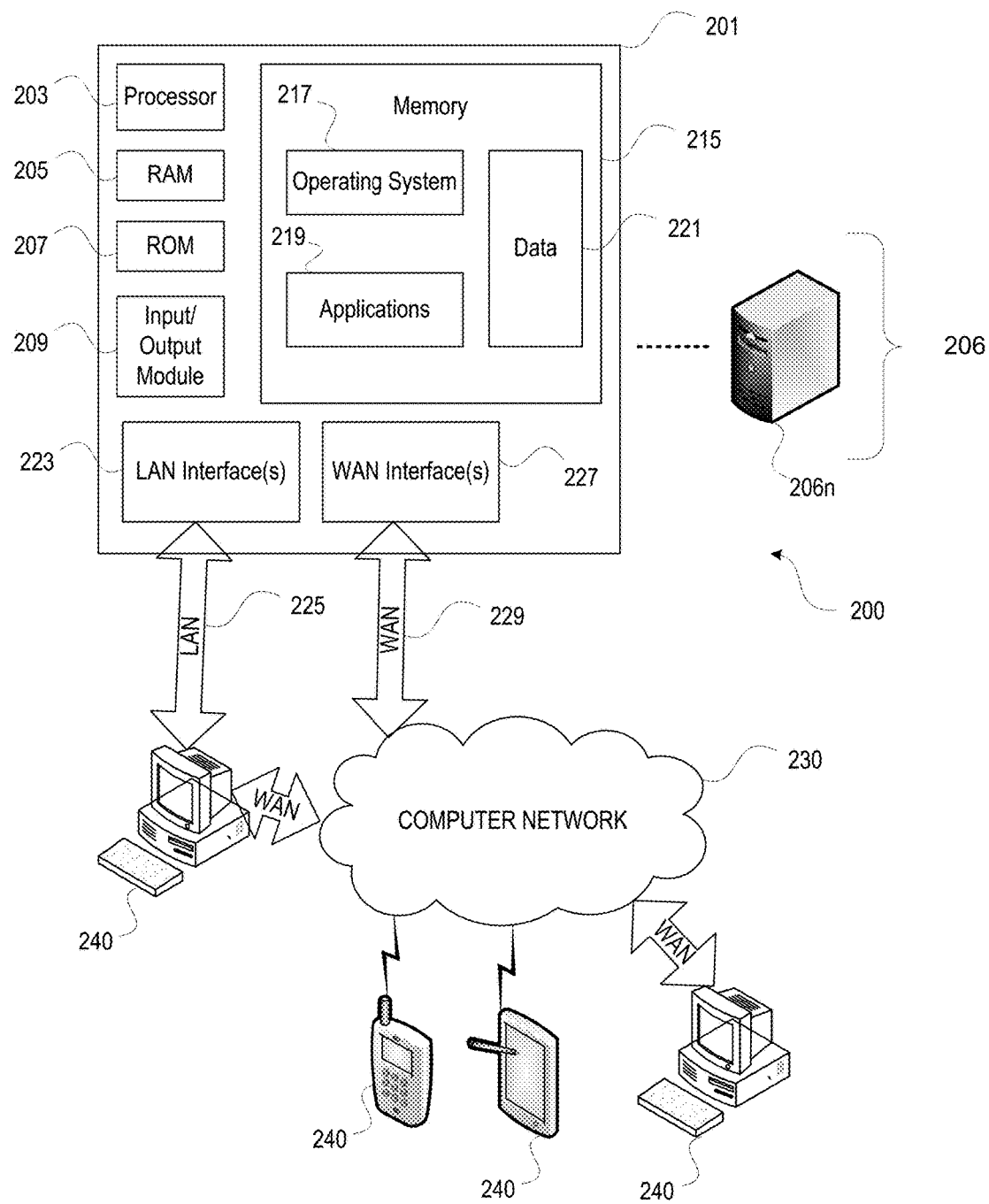
FIG. 2 depicts an example remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the data server 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
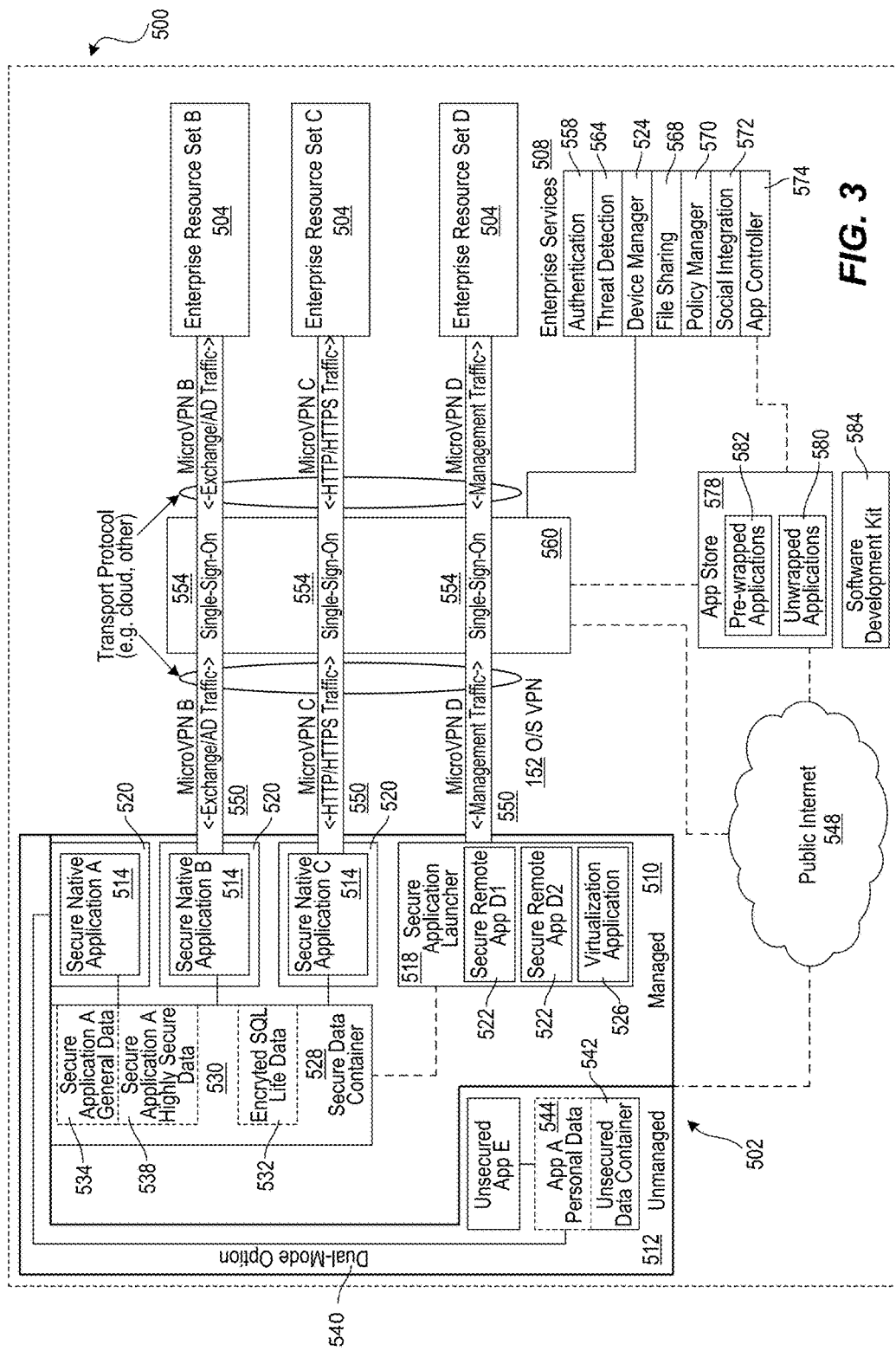
FIG. 3 depicts an example of an enterprise mobility management system that may be used in implementing one or more illustrative aspects described herein.

FIG. 3 represents an enterprise mobility technical architecture 500 for use in a bring your own device (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, an Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
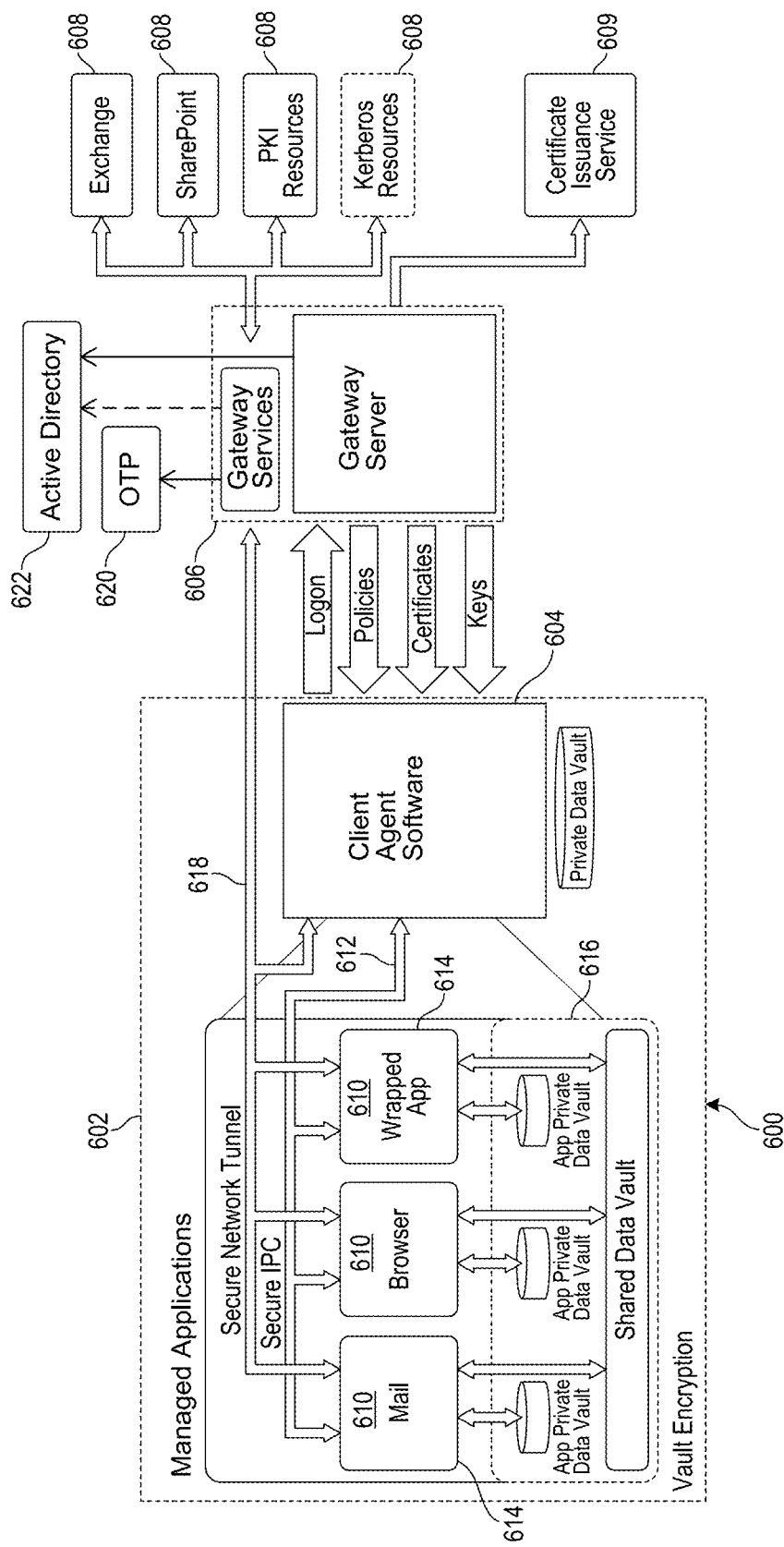
FIG. 4 depicts another example of an enterprise mobility management system that may be used in implementing one or more illustrative aspects described herein.

FIG. 4 is another illustrative enterprise mobility management system 600. Some of the components of the mobility management system 500 described above with reference to FIG. 3 have been omitted for the sake of simplicity. The architecture of the system 600 depicted in FIG. 4 is similar in many respects to the architecture of the system 500 described above with reference to FIG. 3 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign-on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Examples of Wrapping an Application with Field Programmable Business Logic

Figure 5:
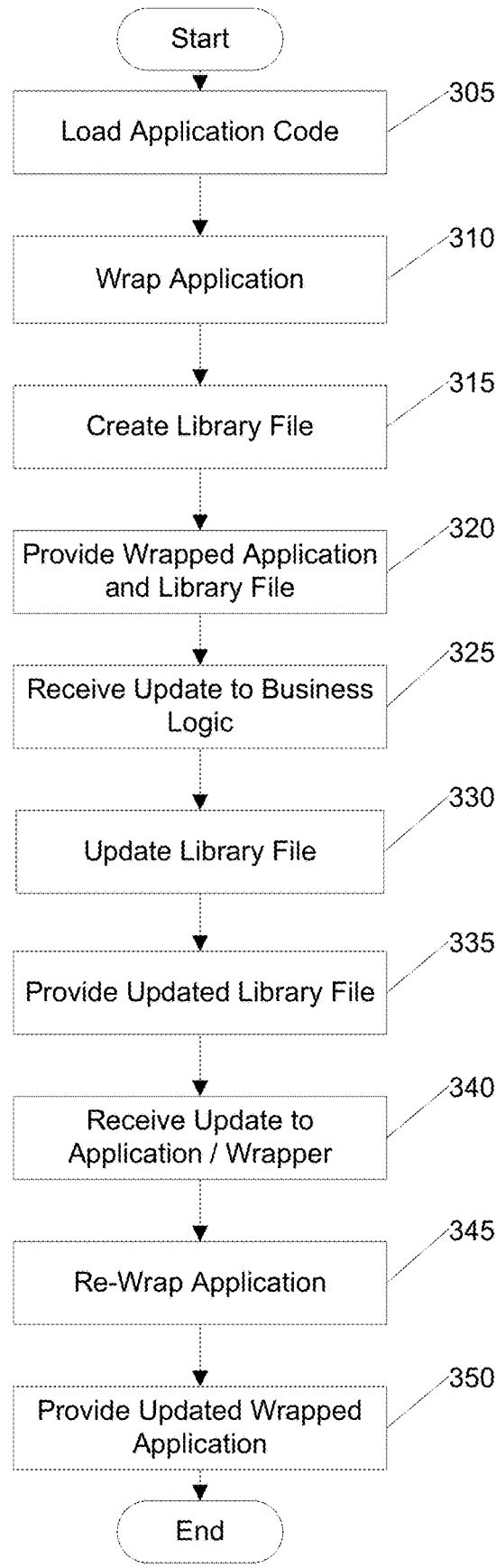
FIG. 5 depicts a flowchart illustrating a method of updating a wrapped application with field-programmable business logic in accordance with one or more illustrative aspects described herein.

FIG. 5 depicts a flowchart that illustrates methods of wrapping an application with field-programmable business logic in accordance with one or more illustrative aspects discussed herein. In one or more embodiments, the method illustrated in FIG. 5 and/or one or more steps thereof may be performed by a computing device (e.g., data server 103). Additionally or alternatively, the method illustrated in FIG. 5 and/or one or more steps thereof may, in some instances, be performed by a mobile device (which may, e.g., implement one or more aspects of a computing device, such as device 107). In other embodiments, the method illustrated in FIG. 5 and/or one or more steps thereof may be embodied in computer-executable instructions that are stored in a computer-readable medium, such as a non-transitory computer-readable memory.

As seen in FIG. 5, the method may begin at step 305 in which application code of may be loaded. For example, at step 305, a computing device (e.g., data server 103) may load application code of a mobile application. For example, the application code may be source code that defines all of and/or a portion of an Android application, an iOS application, a Windows application, a Linux application, or any other application type suitable for use in a computing device. In some instances, the computing device may load the application code from a binary file received by the computing device. In some instances, the application code may be present on the computing device (e.g., stored on the computing device), and loaded by the operating system. In other examples, the computing device and/or the operating system on the computing device may load the application code from an application store. For example, on an Android device, the Android operating system may load the application code from the Google Play Store. For another example, on an Apple device, the Apple iOS operating system may load the application code from the Apple App Store. In other examples, the computing device may load the application code from a different application repository, or directly from device memory. In some instances, the computing device may receive the application code by network interface 117 or input/out interface 119.

As seen in FIG. 5, the method may continue at step 310, in which the application code may be wrapped. For example, at step 310, the computing device (e.g. data server 103) may load application code to wrap a mobile application with an application wrapper that is configured to manage execution of the application based on one or more policy files. The application wrapper may be further configured to intercept one or more function calls of the application code, and the one or more policy files may each define one or more access controls that are enforced by a device management system on one or more user devices. In some instances, the wrapped application may include a single executable file with modified code. In other instances, the wrapped application may include a number of interrelated files that may operate together to perform some function. For example, the wrapped application may be a combination of executable files, linked libraries, Java classes, data files, or any other file type suitable for execution alone or when combined with another file. In some instances, the application wrapper may manage the execution of the application by adding or restricting functions of an executable file. Additionally or alternatively, the application wrapper may manage the execution of the application by enhancing or restricting user access to functions of an executable file. In some instances, policy files may include access controls an administrator may put in place. For example, policy files may add or restrict functions accessible by a specific user in specific circumstances that may be defined by one or more policies in the policy files. In one example, a policy file may specify access controls disabling a phone camera a microphone. In another example, a policy file may allow for remote access, or disable access to a function when not in the presence of a wireless connection. In some instances, the device management system may include an application on a remote computer 107. In some instances, the device management system may include a centralized management system, which may propagate access controls to a number of client devices.

As seen in FIG. 5, the method may continue at step 315, in which a library file may be created. For example, at step 315, the computing device (e.g. data server 103) may create a library file that includes field-programmable business logic defining implementation code linked to one or more of the functions intercepted by the wrapper. For example, a library file implementation might be a dynamic link library, a Java class, or any other similar file type suitable for an application. In some instances, field-programmable business logic may include logical instructions that may allow a wrapper to manage execution of an application. For example, field-programmable business logic may define implementation code including a code definition for a declaration made in a wrapper. In another example, field-programmable business logic may define implementation code comprising other implementation logic, such as a Python code file or a Java code file.

As seen in FIG. 5, the method may continue at step 320, in which a wrapped application and library file may be provided. For example, at step 320, a computing device (e.g. data server 103) may provide the wrapped application and library file to at least one user device. For example, the computing device may provide the wrapped application and library file by sending the wrapped application and library file via network interface 117 or input/output interface 119 to a computing device that is used by a particular user. For example, the computing device may provide the wrapped application and library file in response to a request from a remote computer 107. For instance, the remote computer 107 may request the wrapped application and library file from a store front, such as an application store like the Google Play Store, the Apple App Store, or any other application repository. As another example, the computing device may push the wrapped application and library file to the client device externally. For instance, the remote computer 107 may load an application image file containing the wrapped application and library file, or may have the application and library file pushed to the client device by the computing device.

As seen in FIG. 5, the method may continue at step 325, in which an update to business logic may be received. For example, at step 325, the computing device (e.g. data server 103) may receive an update to business logic defining updated implementation code linked to functions intercepted by the wrapper. For example, the update may include updated code or underlying logic. As another example, the update may include replacement code that replaces, in whole or in part, code or underlying logic.

As seen in FIG. 5, the method may continue at step 330, in which the library file may be updated. For example, at step 330, the computing device (e.g. data server 103) may create an updated library file comprising the updated field-programmable business logic from step 325. For example, in creating the updated library file, the computing device may revise an existing library file with updated code that includes the updated field-programmable business logic. For instance, a separate application executing on the remote computer 107 may make modifications to the business logic based on instructions received by the computing device. As another example, in creating the updated library file, the computing device may replace code or logic comprising the updated field-programmable business logic. For instance, a software tool in the remote computer 107 may replace existing files with updated files. Or, for instance, the software tool may replace batches of code or logic with updated code or logic.

As seen in FIG. 5, the method may continue at step 335, in which the updated library file may be provided. For example, at step 335, the computing device (e.g. data server 103) may provide the updated library file to the at least one user device (e.g., by sending the updated library file to the at least one user device via one or more communication interfaces). This may cause the application wrapper to use the updated business logic to manage execution of the wrapped application. For example, the computing device may provide the updated library file through network interface 117 or input/output interface 119. For example, the computing device may supply the updated library file in response to a request from a remote computer 107. For instance, the remote computer 107 may request the updated library file from an application store, such as a store front like the Play Store, the App Store, or any other application repository. As another example, the computing device may push the updated library file to the remote computer 107. For instance, the remote computer 107 may be flashed with an image containing the updated library file, or may have the updated library file pushed to the remote computer 107 by the computing device.

In some embodiments, the updated library file may cause additional wrappers to use the updated business logic to manage execution of other wrapped applications. For instance, a remote computer 107 may contain a number of managed applications. A single updated library file may contain updates for multiple or all managed applications on a device. In some instances, an agent application may provide the updated library file to the managed applications. In some instances, the updated library file may allow the managed applications to be updated without a need to re-wrap those applications.

As seen in FIG. 5, the method may continue at step 340, in which an update to a wrapped application may be received. For example, at step 340, the computing device (e.g. data server 103) may receive an application update indicating that an update to a wrapper is available. For example, the update may include information updating one or more files that may make up the wrapped application. For instance, the update may include a set of instructions that allow the remote computer 107 to revise or replace files. In another instance, the update may include replacements for code or one or more files that may make up the wrapped application.

As seen in FIG. 5, the method may continue at step 345, in which the application may be re-wrapped. For example, at step 345, the computing device (e.g. data server 103) may replace the wrapper and/or the application with the updated wrapped application, which may use the update from step 340. For example, the separate application executing on the remote computer 107 may make modifications to the business logic based on instructions received by the computing device. As another example, re-wrapping the application may involve a device replacing code or logic. For instance, the separate application may replace existing files with updated files. Or, for instance, a software tool may replace batches of code or logic with updated code or logic.

As seen in FIG. 5, the method may continue at step 350, in which the updated wrapped application may be provided. For example, at step 350, the computing device (e.g. data server 103) may provide the updated wrapped application to the at least one user device. For example, the computing device may provide the updated wrapped application by sending the updated wrapped application to the at least one user device via network interface 117 or input/output interface 119. For example, the updated wrapped application may be provided in response to a request from a remote computer 107. For instance, the remote computer 107 may request the updated wrapped application from the application store, wherein the store front may be the Play Store, the App Store, or any other application repository. As another example, the updated wrapped application may be pushed to the client device externally. For instance, the remote computer 107 may be flashed with an image containing the updated wrapped application, or may have the updated wrapped application pushed to the remote computer 107 by the computing device.

Figure 6:
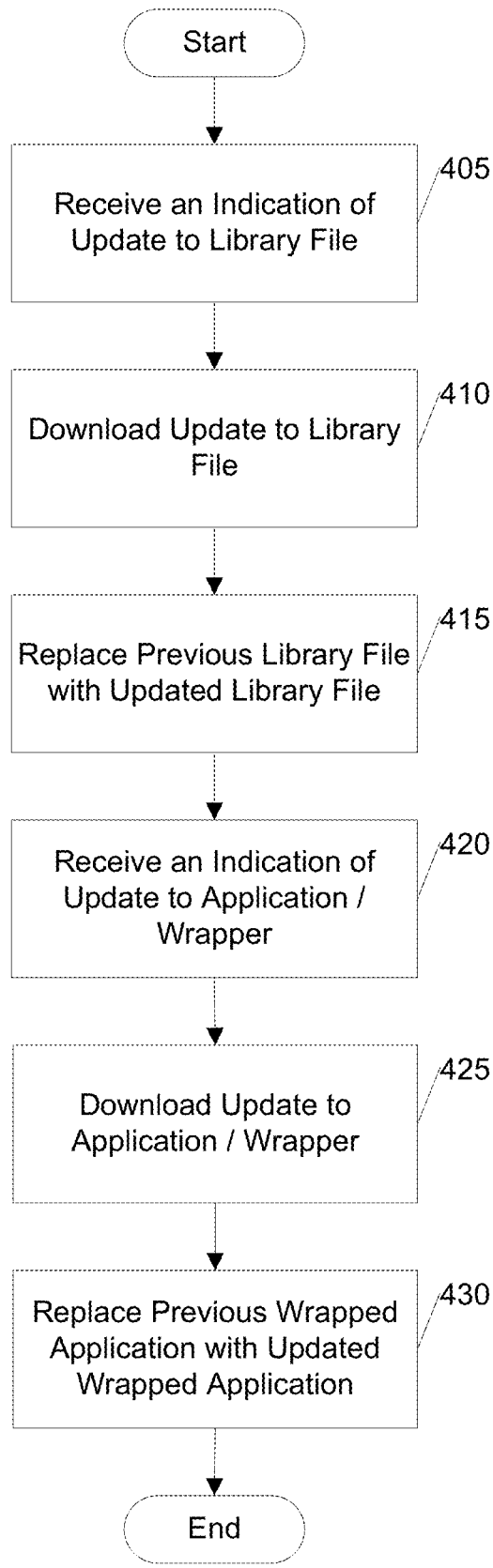
FIG. 6 depicts a flowchart illustrating a method of receiving an update for a wrapped application with field-programmable business logic in accordance with one or more illustrative aspects described herein.

FIG. 6 depicts a flowchart that illustrates methods of updating a library file and an wrapped application in accordance with one or more illustrative aspects discussed herein. In one or more embodiments, a client device (e.g., remote computer 107) may perform the method illustrated in FIG. 6 and/or one or more steps thereof. Additionally or alternatively, the computing device may be a mobile device. In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 405, in which an indication of an update to a library file may be received. For example, at step 405, the client device (e.g. remote computer 107) may receive an indication of an update to a first library file. The first library file may include field programmable business logic defining implementation code linked to one or more functions intercepted by a wrapper. The wrapper may be configured to manage execution of a mobile application on the client device based on one or more policy files defining one or more access controls that are enforced by a device management system on the client device. For example, the update may supply updated code or underlying logic to the remote computer. As another example, the update may supply replacements, in whole or in part, for code or underlying logic to the remote computer. The indication of the update to the first library file that is received by the client device at step 405 may, for example, include information indicating that an update to the first library file is available and/or information defining the updated business logic and/or implementation code that may be associated with the business logic.

As seen in FIG. 6, the method may continue at step 410, in which an update to a library file may be downloaded. For example, at step 410, a client device (e.g. remote computer 107) may download an updated library file in response to receiving an indication that an update is available. The updated library file might include field programmable business logic defining updated implementation code linked to functions intercepted by the wrapper. In some instances, the updated library file may have been provided as in step 335. The client device may download the application through network interface 117 or input/output interface 119. Another device, a server, a repository such as the Google Play Store or Apple App Store, or any application repository might supply the file in some instances.

As seen in FIG. 6, the method may continue at step 415, in which the previous library file may be replaced with the updated library file. For example, at step 415, the client device (e.g. remote computer 107) may replace the first library file with the updated library file. The wrapper may then use the updated field programmable business logic when managing the execution of the mobile application. For instance, the client device may replace a stand-alone file with another file. As examples, the client device may replace a file containing Java classes with another file containing java classes, or replace one dynamic link library file with another dynamic link library file.

In some embodiments, an application may use the updated library file without the need for re-wrapping the application. Further, in some embodiments, additional wrappers may use the updated business logic to manage execution of additional wrapped applications. For instance, a remote computer 107 may contain a number of managed applications. A single updated library file may contain updates for multiple or all managed applications on a device. In some instances, the updated library file may allow additional managed applications to be updated without a need to re-wrap those additional applications. For example, multiple wrappers may use a library file stored in the file system such that replacing an old library file with an updated library file replaces the file for multiple wrappers and allows the managed applications to use the updated field programmable business logic without re-wrapping. In some instances, an agent application may provide the updated library file to the managed applications. For example, the agent may receive one copy of the updated library file and may distribute the updated library file among the managed applications for their use.

As seen in FIG. 6, the method may begin at step 420, in which an indication of an update to a wrapper for an application may be received. For example, at step 420, a client device (e.g. remote computer 107) may receive an application update indicating that an update to a wrapper for the application is available. For example, the update may include updates to one or more files that may make up the wrapped application. For instance, the update may include a set of instructions for the client device to revise one or more files that make up the application. In another instance, the update may include replacements for code or one or more files that may make up the wrapped application.

As seen in FIG. 6, the method may continue at step 425, in which an update to a wrapper for an application may be downloaded. For example, at step 425, a computing device (e.g. data server 103) may download an updated wrapped application. In some instances, the updated wrapper for an application may have been provided as in step 350. The client device may download the application through network interface 117 or input/output interface 119. Another device, a server, a repository such as the Google Play Store or Apple App Store, or any application repository might supply the file.

As seen in FIG. 6, the method may continue at step 430, in which the previous library file may be replaced with the updated library file. For example, at step 430, the client device (e.g. remote computer 107) may replace the wrapper and the application with the updated wrapped application. For instance, the client device may replace a stand-alone file with another file. For instance, an application running on the client device may make modifications based on instructions received by the client device. As another example, re-wrapping the application may include replacing code or logic. For instance, a software tool on the client device may replace existing files with updated files. Or, for instance, the software tool may replace batches of code or logic with updated code or logic.

In some embodiments, the library file may be of a certain type. For example, in some embodiments, the library file may be an iOS library. In another example, the library file may be an Android Library. In another example, the library file may be a dynamic link library. The library file may also be a Windows library, a Windows phone library, or any other suitable file type for a library file.

In some embodiments, implementation code may be code definitions that implement code. For example, a stub function may be a .h file, and implementation code may be a .cpp file. As another example, in Java, the application wrapper may be defined as a Java class, and that class may be implemented by the implementation code. Further, any number of other means may be used to create implementation code, including languages such as C, C#, assembly, or binary files. A wrapper might be a function, and the implementation code may be a binary file injected into the wrapper in order to create executable code within an operating system. Implementation code may run independently, and simply be called by the wrapper, or it may require the wrapper to operate.

In some embodiments, modifying the application code may include adding at least one stub function to the application wrapper, the at least one stub function may reference the implementation code provided in the library file. A stub function may be a declaration of a function that overrides a function that already exists in an application. A stub function may also be a function created for the purpose of aiding the application wrapper and may add some additional functionality. The stub function may reference implementation code in the library file that limits functionality.

In some embodiments, modifying the application code may include renaming a function defined in an application programming interface used by the application to cause execution of at least a portion of the implementation code defined in the field programmable business logic. For example, the computing device or client device might rename an existing declaration for a function and create a new declaration with the original function, so that function calls refer to the new function in place of the original function. For instance, a function "camera( )" in the application programming interface might be changed to "camera.old( )", and a new "camera( )" might be created that simply terminates. This may prevent the user from being able to take a picture with a camera with his or her smartphone. In another example, an existing function may be renamed, with no replacement given, so that the existing function no longer operates.

In some embodiments, modifying the application code may include inserting an application hook into the application. The application hook might cause execution of a portion of the implementation code defined in the field programmable business logic. For example, the computing device or client device might insert a subroutine to monitor for execution of a branch of code, and the subroutine may execute code when the branch is detected. In another example, the computing device or client device might insert a branching instruction that jumps to execution of the implementation code from a certain point in an application's code.

In some embodiments, the updated library file may be provided to the at least one user device in response to determining that the at least one user device is using outdated business logic. For example, the computing device or client device might determine that the library file is outdated. For instance, a storefront application store such as the Google Play Store or the Apple App Store may assist the computing device or client device in determining that the library file is outdated. In another instance, the client device may either check or receive an indication from the computer device indicating that the library file may be outdated. A library file may be outdated if a new file is available, if the existing file is discontinued, if a revision to a file is available, etc.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   loading, by a computing device, application code of a mobile application;
   modifying, by the computing device, the application code to wrap the application with an application wrapper that is configured to manage execution of the application based on one or more policy files and configured to intercept one or more functions of the application code, wherein the one or more policy files each define one or more access controls that are enforced by a device management system on one or more user devices;
   creating, by the computing device, a library file comprising field-programmable business logic defining implementation code linked to one or more of the functions intercepted by the wrapper; and
   providing, by the computing device, the wrapped application and the library file to at least one user device.

2. The method of claim 1, wherein one or more other application codes are modified with one or more other wrappers configured to manage execution of one or more other applications, and wherein the implementation code linked to one or more of the functions are intercepted by the one or more other wrappers.

3. The method of claim 1, wherein modifying the application code comprises adding at least one stub function to the application wrapper, the at least one stub function referencing the implementation code provided in the library file.

4. The method of claim 1, wherein modifying the application code comprises renaming a function defined in an application programming interface used by the application to cause execution of at least a portion of the implementation code defined in the field programmable business logic.

5. The method of claim 1, wherein modifying the application code comprises inserting at least one application hook into the application, the at least one application hook causing execution of a portion of the implementation code defined in the field programmable business logic.

6. The method of claim 1, further comprising:
   after providing the wrapped application and the library file to the at least one user device, creating, by the computing device, an updated library file, wherein the updated library file comprises updated field-programmable business logic defining updated implementation code linked to functions intercepted by the wrapper; and
   providing, by the computing device, the updated library file to the at least one user device to cause the application wrapper to use the updated business logic to manage execution of the wrapped application.

7. The method of claim 6, wherein the updated library file is provided to the at least one user device in response to determining that the at least one user device is using outdated business logic.

8. The method of claim 2, further comprising:
   after providing the wrapped application and the library file to the at least one user device, creating, by the computing device, an updated library file, wherein the updated library file comprises updated field-programmable business logic defining updated implementation code linked to functions intercepted by the wrapper; and
   providing, by the computing device, the updated library file to the at least one user device to cause the application wrapper and the one or more other wrappers to use the updated business logic to manage execution of the wrapped application and the one or more other applications.

9. One or more non-transitory computer-readable media storing instructions that, when executed by at least one computing device, cause the at least one computing device to:
load application code of a mobile application;
modify the application code to wrap the application with an application wrapper that is configured to manage execution of the application based on one or more policy files and configured to intercept one or more functions of the application code, wherein the one or more policy files each define one or more access controls that are enforced by a device management system on one or more user devices;
create a library file comprising field-programmable business logic defining implementation code linked to one or more of the functions intercepted by the wrapper; and
provide the wrapped application and the library file to at least one user device.

10. The one or more non-transitory computer-readable media of claim 9, wherein one or more other application codes are modified with one or more other wrappers configured to manage execution of one or more other applications, and wherein the implementation code linked to one or more of the functions are intercepted by the one or more other wrappers.

11. The one or more non-transitory computer-readable media of claim 9, wherein modifying the application code comprises adding at least one stub function to the application wrapper, the at least one stub function referencing the implementation code provided in the library file.

12. The one or more non-transitory computer-readable media of claim 9, wherein modifying the application code comprises renaming a function defined in an application programming interface used by the application to cause execution of at least a portion of the implementation code defined in the field programmable business logic.

13. The one or more non-transitory computer-readable media of claim 9, wherein modifying the application code comprises inserting at least one application hook into the application, the at least one application hook causing execution of a portion of the implementation code defined in the field programmable business logic.

14. The one or more non-transitory computer-readable media of claim 9, having additional instructions stored thereon that, when executed by the at least one computing device, further cause the at least one computing device to:
after providing the wrapped application and the library file, create an updated library file, wherein the updated library file comprises updated field-programmable business logic defining updated implementation code linked to functions intercepted by the wrapper; and
provide the updated library file to the at least one user device to cause the application wrapper to use the updated business logic to manage execution of the wrapped application.

15. The one or more non-transitory computer-readable media of claim 14, wherein the updated library file is provided to the at least one user device in response to determining that the at least one user device is using outdated business logic.

16. A computing device, comprising:
at least one processor; and
memory storing computer-readable instructions that, when executed by the at least one processor, cause the computing device to:
receive an indication of an update to a first library file, wherein the first library file comprises field programmable business logic defining implementation code linked to one or more functions intercepted by a wrapper, the wrapper being configured to manage execution of a mobile application on the computing device based on one or more policy files defining one or more access controls that are enforced by a device management system on the computing device;
download an updated library file in response to receiving the indication, wherein the first library file comprises updated field programmable business logic defining updated implementation code linked to functions intercepted by the wrapper; and
replace the first library file with the updated library file to cause the wrapper to use the updated field programmable business logic when managing the execution of the mobile application.

17. The computing device of claim 16, wherein the memory stores additional computer-readable instructions that, when executed by the at least one processor, further cause the computing device to:
after receiving the indication of the update to the first library file, receive an application update indicating that an update to a wrapper for the application is available;
download an updated wrapped application; and
replace the wrapper and the application with the updated wrapped application.

18. The computing device of claim 16, wherein the wrapper comprises at least one stub function, the at least one stub function referencing the implementation code provided in the library file.

19. The computing device of claim 16, wherein the wrapper comprises a renamed function defined in an application programming interface used by the application to cause execution of at least a portion of the implementation code defined in the field programmable business logic.

20. The computing device of claim 16, wherein the wrapper comprises at least one application hook inserted into the application, the at least one application hook causing execution of a portion of the implementation code defined in the field programmable business logic.

* * * * *